United States Patent [19]

Manes

[11] 4,058,457
[45] Nov. 15, 1977

[54] RECOVERY OF ACTIVATED CARBON

[76] Inventor: Milton Manes, 1613 Chadwick Drive, Kent, Ohio 44240

[21] Appl. No.: 746,624

[22] Filed: Dec. 1, 1976

[51] Int. Cl.$^2$ ............................................. B01D 15/06
[52] U.S. Cl. ...................... 210/32; 210/40; 252/415; 260/627 R; 260/674 SA
[58] Field of Search ............. 210/26, 29, 30 R, 30 A, 210/32, 39, 40, 62, 80; 252/415; 260/499, 525, 582, 583 N, 593 P, 627 R, 637 R, 643 G, 652 P, 674 SA, 676 AD, 677 AD, 679 A, 681.5 R

[56] References Cited
U.S. PATENT DOCUMENTS

| | | | |
|---|---|---|---|
| 1,617,533 | 2/1927 | Mahler | 252/415 |
| 3,448,042 | 6/1969 | Mattia et al. | 210/26 |
| 3,772,189 | 11/1973 | Kreusch et al. | 210/40 |
| 3,965,036 | 6/1976 | Himmelstein | 210/32 |
| 3,965,037 | 6/1976 | Kennedy | 252/415 |

OTHER PUBLICATIONS

Rosene et al., "Application of the Polanyi Adsorption Potential Theory to Adsorption from Solution on Activated Carbon", *Journal of Physical Chemistry*, vol. 80, No. 9, pp. 953–959 (1976).

*Primary Examiner*—Charles N. Hart
*Assistant Examiner*—Ivars Cintins
*Attorney, Agent, or Firm*—Cushman, Darby & Cushman

[57] ABSTRACT

Activated carbon employed for removing weakly held contaminants such as organic chemicals from water, e.g., drinking water, can be recovered or regenerated by back flushing with iodine in water or an organic solvent and then the iodine recovered by reducing it to iodide and the iodide rinsed out of the carbon and reoxidized to iodine. The process can also be used to recover pure organic compounds adsorbed on the carbon.

17 Claims, No Drawings

RECOVERY OF ACTIVATED CARBON

BACKGROUND OF THE INVENTION

It is well known that certain adsorbed substances may be displaced from adsorbents such as activated carbon by a still more strongly adsorbed substance; indeed, on weak adsorbents the process of adsorptive displacement is responsible for the phenomenon of solid-liquid chromatography. The criteria for displacement of one solute by another on activated carbon have recently been disclosed by Rosene and Manes (J. Phys. Chem. 80, 953 (1976)). In general, on an essentially non-polar adsorbent such as activated carbon, an adsorbate can be displaced only into a solvent in which it is soluble and usually by a displacing agent with a higher (electrical) polarizability per unit volume. For example, glucose can be displaced in water solution by p-nitrophenol. Older examples of displacement are of stearic acid by phenol in alcohol solution from activated carbon (Tiselius and Claesson, Arkiv Kemi Mineral. Geol. A16, No. 18 (1943); C. E. Dalgleish, Biochem J. 61, 334 (1955)); stearic acid is not displaced significantly in water solution because of its low solubility in water.

The removal of adsorbates from activated carbon by chemical displacement could have a number of important advantages. One is in the use of carbon in the treatment of potable waters to remove possible carcinogens and other impurities of relatively low molecular weight, such as chloroform, dichloromethane, dichloroethane, etc. Here the capacity of the carbon is relatively low and it is relatively expensive to remove the carbon for conventional thermal regeneration; an in situ process would be of considerable advantage. Another application is in the treatment of waste waters, where certain refractory adsorbates resist regeneration by thermal treatment, so that one does not recover original activity on thermal regeneration, even after allowances for furnace losses. Finally, a chemical regeneration process would be of advantage in attaining quantitative removal of expensive substances on process carbons, substances that would ordinarily be lost in thermal regeneration. The chief stumbling-block to chemical regeneration has been the problem of removing a displacing agent, since any such material would have to be more strongly adsorbed than the most strongly held adsorbate on the carbon. Finally, in the recovery of expensive substances from activated carbon, even by a process that would leave the displacing agent on the carbon, there is the problem of the potential toxicity of a displacing agent.

SUMMARY OF THE INVENTION

In one aspect of the invention activated carbon which has been employed to remove organic impurities from drinking water or waste water, e.g., sewage or industrial waste, etc., is recovered or regenerated by passing iodine as the displacing agent through the spent or even partially exhausted carbon. The iodine can be employed in solution either in water, with or without potassium iodide, or in solution in an organic solvent.

Iodine in many organic solvents appears to be the strongest displacing agent for activated carbon and can displace the most strongly held adsorbates. For example, iodine quantitatively removes p-nitrophenol in ethanol solution, p-nitrophenol being a very powerfully held adsorbate. In water solution or in aqueous solution also containing iodide ion (e.g., potassium iodide or sodium iodide) iodine is still a powerful displacing agent, readily displacing low molecular weight chlorinated hydrocarbons, for example. While iodine in aqueous solution does not completely displace very strongly held adsorbates, such as nitrophenols, highly aromatic water-soluble dyes, or substances with very low water solubility, the use of iodine in organic solvents can be used to remove such materials.

The exact concentration of the iodine is not critical. While it is convenient to use a saturated solution of the iodine there can be used less concentrated solutions if desired, e.g., there can be used a 0.1 N solution in aqueous potassium iodide, e.g., a solution containing 12.7 grams of iodine and 40 grams of potassium iodide in 1 liter of water. An example of a saturated solution is one prepared in equilibrium with solid iodine and $KI_7.H_2O$ containing 67.8% iodine, 25.6% potassium iodide, and 6.6% water. A saturated solution of iodine in pure water at 25° C contains 0.340 grams per liter.

As organic solvents for iodine there can be used for example hydrocarbons such as benzene, toluene, mesitylene, p-xylene, o-xylene, m-xylene, n-heptane, n-hexane, isooctane (2,2,4-trimethylpentane), 2,2-dimethylbutane and cyclohexane, alcohols, e.g., methyl alcohol, ethyl alcohol, propyl alcohol, isopropyl alcohol, isobutyl alcohol, n-butyl alcohol, glycerol and ethylene glycol, halohydrocarbons such as chloroform, bromoform, cis-dichloroethylene, trans-dichloroethylene, ethylene bromide, ethylene chloride, ethylidene chloride, pentachloroethane, perfluoroheptane, sym-tetrachloroethane, tetrachloroethylene, esters of carboxylic acids, e.g., alkyl alkanoates such as ethyl acetate, propyl acetate, butyl acetate, ethyl propionate, carboxylic acids, e.g., glacial acetic acid, ethers, e.g., diethyl ether, dipropyl ether and dibutyl ether, nitriles, e.g., propionitrile and carbon disulfide. The solutions in organic solvents also can be either saturated or less than saturated. An example of a less than saturated solution is a solution of 25 grams of iodine in a liter of alcohol.

The second aspect of the invention is the recovery of the iodine, preferably in quantitative fashion. Although molecular iodine is powerfully adsorbed, iodide salts are very weakly adsorbed. The recovery of the iodine is readily effected by reduction with any convenient reducing agent such as sodium sulfite, potassium sulfite, stannous chloride, titanium trichloride, sulfurous acid or sodium or potassium thiosulfate, which are in turn readily washed from the carbon with water. The iodine can then be readily recovered in turn by oxidation of the aqueous solution with any convenient oxidizing agent, such as chlorine. The iodine can be separated from water solution by precipitation as a solid and residual traces recovered with relatively small amounts of carbon. The displaced substances may be discarded or recovered, depending on the application. The reactions for reduction and oxidation of iodine in solution are well known.

For regeneration of activated carbon employed in the treatment of potable waters, the invention has the additional advantage that residual traces of iodine and sulfite are of low toxicity (traces of excess sulfite may be oxidized in the iodine recovery process) and tend to inhibit the growth of bacterial slimes and molds.

For the regeneration of activated carbon used in water-treatment it is not necessary that the regeneration remove the most refractory adsorbates, since the capacity for such substances is economically high. Thus one could regenerate in water solutions repeatedly, followed either by thermal reactivation or extraction in situ with iodine in, for example, ethanol solution, the ethanol being chosen as a solvent because of its low toxicity in dilute solution.

In the reduction of the iodine adsorbed on the carbon to iodide there can be employed a saturated or less than saturated solution of the reducing agent. Thus, there can be used a saturated solution of sodium thiosulfate or a 0.1 N solution of sodium thiosulfate in water.

In a third aspect of the invention there can be recovered valuable organic chemicals in pure form that have been adsorbed on the carbon. Thus, antibiotics, e.g., penicillin and lincomycin, or p-nitrophenol or diazepam which have been adsorbed on the carbon can be released therefrom by passing the iodine solution through the carbon having the organic chemical, e.g., penicillin, adsorbed thereon. The iodine should be employed in solution in a solvent for the organic chemical, e.g., alcohol for p-nitrophenol, penicillin, lincomycin or acetone for diazepam.

The organic compound can thus be recovered from the solvent in conventional manner, e.g., by evaporating to dryness or by crystallization.

Among the compounds adsorbed on activated carbon which can be displaced by iodine in aqueous KI solution (that result from adsorption in trace concentrations), i.e., those that can be expected to behave like chloroform, are: acetaldehyde, acetic acid, bromochloromethane, bromomethane, bromotrichloroethane, 1-butanol, carbon disulfide, chloroethane, vinyl chloride, chloromethane, chloropropane, dichloroethane, diethyl ether, benzene, ethyl benzene, acetonitrile, nitromethane, propanol, acetone, toluene, benzene, trichloroethylene, and chloromethyl ethyl ether. (These compounds have all been reported as having been detected in the drinking water of at least one of five U.S. cities investigated (U.S. Environmental Protection Agency, Cincinnati, OH, June 1975)).

Compounds found in drinking water and wastes that are incompletely displaced by aqueous iodine but well displaced by iodine in organic solvents include: benzopyrene, phenols, e.g., phenol per se, resorcinol, hydroquinone, and nitrophenols, e.g., p-nitrophenol, o-nitrophenol and m-nitrophenol, and other substituted phenols, camphor, chlordane, DDT, naphthalene, phenanthrene, dieldrin, polychlorinated biphenyls, endrin, heptachlor, nicotine, and pentachlorophenol.

DESCRIPTION OF THE PREFERRED EMBODIMENTS

EXAMPLE 1

An activated carbon sample in a column exposed to a flow of water containing 1.47 grams/liter of chloroform adsorbed 85 ± 1% by weight of chloroform. The thus loaded carbon was treated with a solution containing excess saturated iodine in potassium iodide (10 g KI per liter $H_2O$), to remove all the chloroform. The iodine-loaded carbon was then treated with a 0.1 N solution of sodium thiosulfate sufficient to react with all the iodine. On retreatment of the activated carbon with the chloroform solution it adsorbed 83 ± 1% chloroform. Within experimental error this was complete regeneration.

EXAMPLE 2

A water solution containing 2.00 grams/liter of p-nitrophenol was passed over a sample of 300 mg of activated carbon in a small column. The loading (calculated from the breakthrough time and flow rate) was 46.7 ± 0.5% by weight. The sample was twice regenerated with saturated iodine in 95% ethanol followed by a water rinse to remove ethanol and then treatment with saturated aqueous sodium thiosulfate to remove the iodine. The subsequent capacities for p-nitrophenol after the two regenerations were 46.8 ± 0.5% and 46.6 ± 0.5% respectively. This demonstrated that there was complete regeneration for this very strongly held substance.

The p-nitrophenol can be recovered in pure form by evaporating to dryness the 95% ethanol solution of p-nitrophenol obtained in the regeneration of the activated carbon in ethanol. Alternatively the ethanol solution can be concentrated by boiling and the more concentrated solution obtained cooled and the p-nitrophenol allowed to crystallize.

The procedure of the invention can be used to regenerate or recover activated carbon regardless of the area of use responsible for it being loaded with organic chemicals, e.g., hydrocarbons, alcohols, phenols, ketones, organic nitro compounds, ethers, halohydrocarbons, nicotine, aldehydes, carboxylic acids or carbon disulfide. Thus, there can be used activated carbon that has been employed to remove taste, odors, carcinogens, and other organic materials from drinking or potable water or that has been employed to remove organics from waste water in industrial plants or sewage.

In recovering or regenerating the activated carbon, the iodine of course can be dissolved in a mixture of organic solvents or a mixture of water and one or more organic solvents (with or without the addition of KI or other solubilizing salt) that is water compatible. An example of a suitable mixture is water-alcohol (e.g., 30:70 or 95:5 by weight) or water-glycerol (50:50 by weight).

The process of the present case comprises, consists essentially or consists of the steps set forth and the materials employed comprise, consist essentially or consist of those set forth.

What is claimed is:

1. A process of recovering or regenerating activated carbon which is at least partially loaded with an organic chemical adsorbed thereon comprising passing a solution of iodine in an aqueous or organic solvent through the carbon to displace the organic chemical by iodine.

2. A process according to claim 1 wherein the organic chemical comprises a hydrocarbon, a halohydrocarbon, an alcohol, an ether, a carboxylic acid, an aldehyde, a phenol, an organic nitro group containing compound, carbon disulfide, nicotine or an organic nitrile.

3. A process according to claim 1 wherein the iodine is employed in aqueous solution.

4. A process according to claim 3 wherein the aqueous solution contains NaI or KI.

5. A process according to claim 4 wherein the aqueous solution contains KI.

6. A process according to claim 1 wherein the iodine is employed in solution in an organic solvent.

7. A process according to claim 1 including the further steps of recovering the iodine from the carbon by passing a reducing agent for iodine through the carbon to convert the iodine to iodide and then washing the iodide out of the carbon with an aqueous or organic solvent.

8. A process according to claim 7 wherein the iodide is washed out with aqueous solvent.

9. A process according to claim 8 wherein the reducing agent is an alkali metal sulfite or alkali metal thiosulfate.

10. A process according to claim 9 wherein the alkali metal is sodium.

11. A process of purifying water comprising passing the water through activated carbon until the carbon is at least partially loaded with adsorbed organic chemicals and then recovering the activated carbon in the manner set forth in claim 1.

12. A process according to claim 11 including the further steps of recovering the iodine from the carbon by passing a reducing agent for iodine through the carbon to convert the iodine to iodide and then washing the iodide out of the carbon with an aqueous or organic solvent.

13. A process according to claim 12 including the step of again using the recovered carbon to purify water.

14. A process according to claim 13 wherein the water to be purified is water to be used for potable purposes.

15. A process according to claim 13 wherein the water to be purified is waste water.

16. A process according to claim 1 wherein an organic compound is adsorbed on the activated carbon and the iodine is employed in a solvent for the organic compound and the organic compound is then recovered from the solvent.

17. A process of recovering an organic compound adsorbed on activated carbon comprising passing a solution of iodine in a solvent for the organic compound through the carbon to displace the organic compound by iodine and then recovering the organic compound from its solution in said solvent.

* * * * *